United States Patent
Li

(10) Patent No.: US 12,283,106 B2
(45) Date of Patent: Apr. 22, 2025

(54) SYSTEMS AND METHODS FOR VIDEO SURVEILLANCE

(71) Applicant: ZHEJIANG DAHUA TECHNOLOGY CO., LTD., Zhejiang (CN)

(72) Inventor: Yuntao Li, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 593 days.

(21) Appl. No.: 17/304,740

(22) Filed: Jun. 24, 2021

(65) Prior Publication Data

US 2021/0319234 A1    Oct. 14, 2021

Related U.S. Application Data

(63) Continuation of application No. PCT/CN2018/125287, filed on Dec. 29, 2018.

(51) Int. Cl.
*G06V 20/52* (2022.01)
*G06T 7/246* (2017.01)
(Continued)

(52) U.S. Cl.
CPC .............. *G06V 20/52* (2022.01); *G06T 7/248* (2017.01); *G06T 7/74* (2017.01); *G06V 20/40* (2022.01);
(Continued)

(58) Field of Classification Search
CPC ...... G06V 20/52; G06V 20/40; G06V 40/161; G06V 10/00; G06V 10/10; G06V 10/20;
(Continued)

(56) References Cited

U.S. PATENT DOCUMENTS

| 6,445,832 B1 * | 9/2002 | Lee ........................ G06V 10/24 382/209 |
| 2008/0100709 A1 * | 5/2008 | Furukawa ............. G01S 3/7865 348/169 |

(Continued)

FOREIGN PATENT DOCUMENTS

| CN | 1924894 A | 3/2007 |
| CN | 103034841 A | 4/2013 |

(Continued)

OTHER PUBLICATIONS

Zhang, Ning et al. , A real-time multi-face detection and tracking method, Flled: Nov. 16, 2018, Published: Apr. 2, 2019, English Translation of CN 109558815 A, 21 pages (Year: 2019).*

(Continued)

*Primary Examiner* — Gandhi Thirugnanam
(74) *Attorney, Agent, or Firm* — METIS IP LLC

(57) ABSTRACT

Systems and methods for tracking an object in video surveillance are provided. A method may include obtaining a video including a plurality of consecutive frames; obtaining a current frame from the plurality of consecutive frames, wherein an object of interest is identified in at least two previous frames of the current frame; obtaining at least two template frames from the at least two previous frames; and identifying a position related to the object of interest in the current frame based on the at least two template frames using a correlation filter.

20 Claims, 8 Drawing Sheets

(51) Int. Cl.
    *G06T 7/73*     (2017.01)
    *G06V 20/40*     (2022.01)
    *G06V 40/16*     (2022.01)

(52) U.S. Cl.
    CPC .. *G06V 40/161* (2022.01); *G06T 2207/10016* (2013.01); *G06T 2207/30201* (2013.01)

(58) Field of Classification Search
    CPC ........ G06V 10/89; G06V 10/92; G06V 10/88; G06V 10/98; G06V 30/00; G06V 40/00; G06V 40/10; G06T 7/248; G06T 2207/10016; G06T 2207/30201; G06T 2207/30232; G06T 7/74; G06T 5/50; G06T 2207/30196; H04N 7/183
    See application file for complete search history.

(56) References Cited

U.S. PATENT DOCUMENTS

| | | | |
|---|---|---|---|
| 2008/0137957 | A1 | 6/2008 | Xu et al. |
| 2011/0221890 | A1 | 9/2011 | Yamashita |
| 2012/0105728 | A1* | 5/2012 | Liu .............. H04N 5/213 |
| | | | 348/607 |
| 2017/0213091 | A1 | 7/2017 | Cao et al. |
| 2019/0147602 | A1* | 5/2019 | Tao .............. G06V 10/809 |
| | | | 382/103 |
| 2019/0205694 | A1* | 7/2019 | Wang .............. G06V 40/165 |
| 2020/0051250 | A1* | 2/2020 | Cao .............. G06T 7/20 |
| 2021/0319234 | A1* | 10/2021 | Li .............. G06T 7/248 |
| 2023/0154016 | A1* | 5/2023 | Ogawa .............. G06V 20/52 |
| | | | 382/103 |

FOREIGN PATENT DOCUMENTS

| | | | |
|---|---|---|---|
| CN | 103259962 | A | 8/2013 |
| CN | 104036237 | A | 9/2014 |
| CN | 104346811 | A | 2/2015 |
| CN | 105512627 | A | 4/2016 |
| CN | 106650682 | A | 5/2017 |
| CN | 106887011 | A | 6/2017 |
| CN | 105046197 | B | 4/2018 |
| CN | 109558815 | A * | 4/2019 |
| JP | 2004046647 | A | 2/2004 |
| WO | 2017027212 | A1 | 2/2017 |

OTHER PUBLICATIONS

JF Henriques et al., High-Speed Track with Kernelized Correlation Filters, IEEE Transactions on Pattern Analysis and Machine Intelligence, 37(3): 583-596, 2015.

Luca Bertinetto et al., Fully-Convolutional Siamese Networks for Object Tracking, European Conference on Computer Vision, 2016, 16 pages.

International Search Report in PCT/CN2018/125287 mailed on Sep. 18, 2019, 4 pages.

Written Opinion in PCT/CN2018/125287 mailed on Sep. 18, 2019, 4 pages.

First Office Action in Chinese Application No. 201880100531.4 mailed on Mar. 29, 2022, 18 pages.

\* cited by examiner

SYSTEMS AND METHODS FOR VIDEO SURVEILLANCE

CROSS-REFERENCE TO RELATED APPLICATIONS

This application is a Continuation of International Application No. PCT/CN2018/125287, filed on Dec. 29, 2018, the entire contents of which are hereby incorporated by reference.

TECHNICAL FIELD

This disclosure generally relates to video surveillance, and more particularly, relates to systems and methods for tracking an object in video surveillance.

BACKGROUND

With the development and wide application of video surveillance techniques, object tracking (e.g., face tracking) is broadly applied in various environmental scenarios and provides key technical support for subsequent object optimization (e.g., face optimization) and object recognition (e.g., face recognition). Usually, faces in a video are tracked based on a percentage of overlapping area related to face regions between two consecutive frames. When a face is not detected in a frame because the face is blocked or blurred, a target tracking algorithm may be used to determine the position of the face in later frames.

The target tracking algorithm mainly extracts key features of a target region in a frame. However, as a non-rigid object, the motion state of a face is uncertain. Faces of a same person appearing in different video sequences may have different shapes, which makes the selection of template features of the person difficult. The selection of the template features may influence the determination of position of the person, thus further influence the accuracy of face tracking when the person moves in different video sequences.

SUMMARY

An aspect of the present disclosure introduces a system for tracking an object in video surveillance. The system may include at least one storage medium including a set of instructions for tracking the object in video surveillance; and at least one processor in communication with the storage medium. When executing the set of instructions, the at least one processor may be directed to: obtain a video including a plurality of consecutive frames; obtain a current frame from the plurality of consecutive frames, wherein an object of interest is identified in at least two previous frames of the current frame; obtain at least two template frames from the at least two previous frames; and identify a position related to the object of interest in the current frame based on the at least two template frames using a correlation filter.

In some embodiments, the at least one processor may be further directed to: identify the object of interest in one or more later frames of the current frame based on the identified position related to the object of interest in the current frame.

In some embodiments, the object of interest is a person of interest, and the at least one processor may be further directed to: obtain one or more tracked faces from the video; determine one or more face regions based on the current frame; select a tracked face from the one or more tracked faces; select a face region from the one or more face regions; and determine whether the face region correlates to the tracked face.

In some embodiments, the at least one processor may be further directed to: in response to a determination that the face region correlates to the tracked face, correlate the face region with a person of interest corresponding to the tracked face; and update the tracked face in the current frame with the face region.

In some embodiments, the at least one processor may be further directed to: in response to a determination that the face region does not correlate to the tracked face, identify the position related to a person of interest in the current frame based on the correlation filter; and update the tracked face in the current frame with the identified position.

In some embodiments, to determine whether the face region correlates to the tracked face, the at least one processor may be further directed to: determine whether a percentage of overlapping area between the face region and the tracked face exceeds an overlapping threshold; and in response to a determination that the percentage of overlapping area exceeds the overlapping threshold, determine that the face region correlates to the tracked face.

In some embodiments, the object of interest is a person of interest, and to obtain the at least two template frames, the at least one processor may be further directed to: determine a matching period associated with the person of interest based on previous frames of the current frame; and determine the at least two template frames based on the matching period, wherein the person of interest is identified in the at least two template frames.

In some embodiments, to identify the position, the at least one processor may be further directed to: determine a searching region in the current frame based on a reference frame associated with the current frame; determine at least two candidate face regions based on the searching region and the at least two template frames using the correlation filter; and identify the position related to the person of interest in the current frame based on the at least two candidate face regions.

In some embodiments, the reference frame is a previous frame next to the current frame.

In some embodiments, the at least two template frames include a first frame in the matching period, a middle frame in the matching period, and a last frame in the matching period.

According to another aspect of the present disclosure, a method for operating one or more servers for tracking an object in video surveillance may include: obtaining a video including a plurality of consecutive frames; obtaining a current frame from the plurality of consecutive frames, wherein an object of interest is identified in at least two previous frames of the current frame; obtaining at least two template frames from the at least two previous frames; and identifying a position related to the object of interest in the current frame based on the at least two template frames using a correlation filter.

According to still another aspect of the present disclosure, a non-transitory computer readable medium, comprising at least one set of instructions for tracking an object in video surveillance, wherein when executed by at least one processor of one or more electronic device, the at least one set of instructions may direct the at least one processor to: obtain a video including a plurality of consecutive frames; obtain a current frame from the plurality of consecutive frames, wherein an object of interest is identified in at least two previous frames of the current frame; obtain at least two template frames from the at least two previous frames; and identify a position related to the object of interest in the current frame based on the at least two template frames using a correlation filter.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
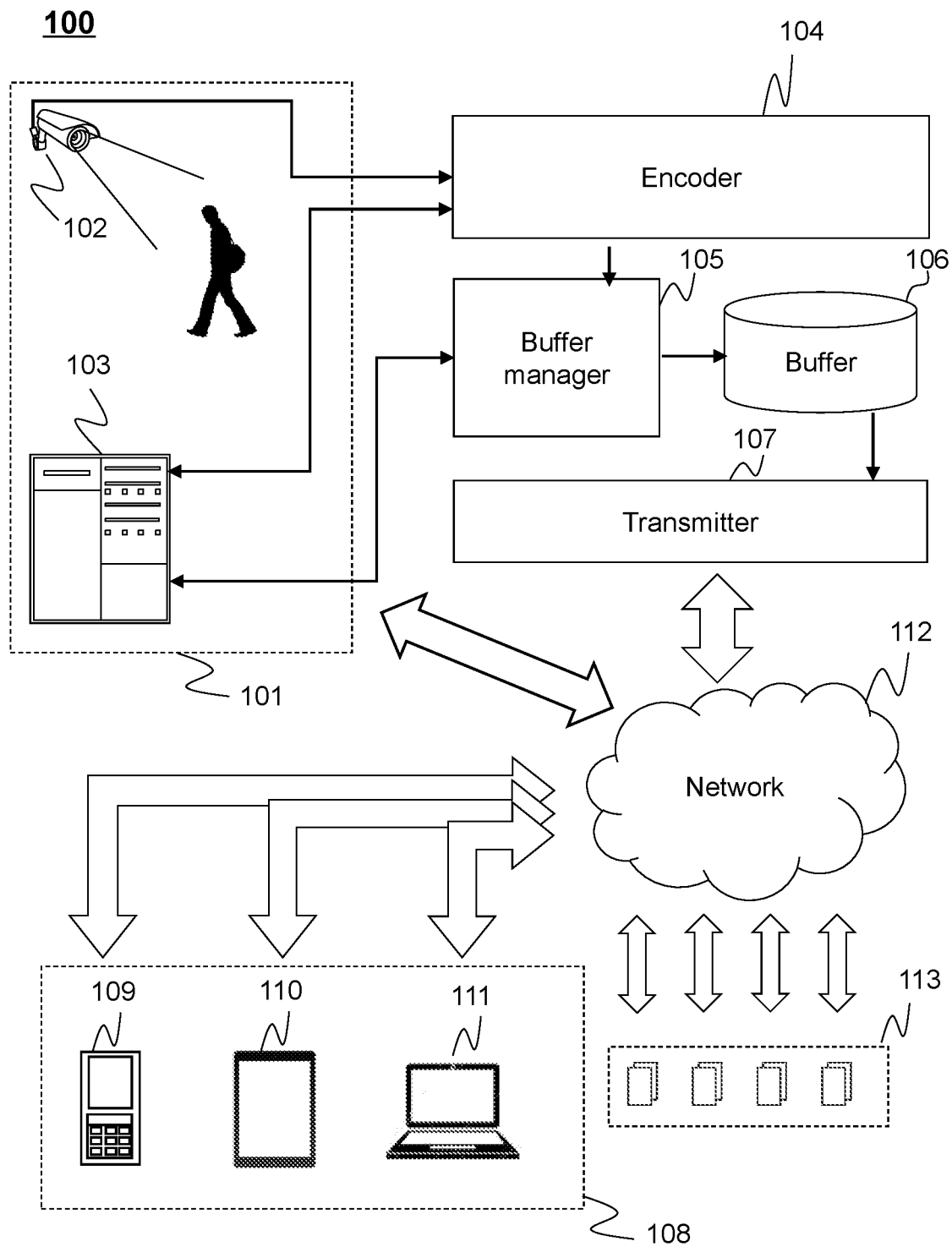
FIG. 1 is a schematic diagram illustrating an exemplary object tracking system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

In an aspect, the present disclosure is directed to systems and methods for tracking one or more objects in a video. The systems and methods may select at least two frames in a video as templates to predict a position of an object of interest in a current frame when the object of interest in the current frame is blocked or cannot be identified. The position may be used to track the object of interest in the video. The selected at least two frames as templates may include different features of the object of interest (e.g., different morphologies of a face of a person of interest), and the object of interest may be identified in the selected at least two frames (e.g., each of the selected at least two frames includes an identified position or region of the object of interest). The systems and methods may determine the position of the object of interest in the current frame based on identified positions or regions of the object of interest in the at least two frames according to a correlation filter. Using different features of the object of interest in the at least two frames, the systems and methods may improve the robustness of tracking the object in the video.

FIG. 1 is a schematic diagram illustrating an exemplary object tracking system according to some embodiments of the present disclosure. The object tracking system 100 may be configured to process an image or a video composed of a plurality of images (also referred to as "frames"). As shown, the object tracking system 100 may include a video source 101, an encoder 104, a buffer manager 105, a buffer 106, a transmitter 107, a terminal 108 (or a plurality of terminals 108), a network 112, and a network storage device 113 (or a plurality of network storage devices 113).

The video source 101 may transmit a video through the network 112 to a terminal 108. The video source 101 may generate the video itself or via a video transfer site. The video source 101 may include a camera 102 and/or a server 103.

The camera 102 may be configured to perform surveillance of an area of interest (AOI) or an object of interest. In some embodiments, the camera 102 may be a stationary video sensor. As used herein, a video sensor may refer to an apparatus for visual recording. The video sensor may capture image data relating to an AOI or an object of interest.

The image data may include a video, an image, or a combination thereof. As used herein, the term "video" may refer to motion pictures represented in analog and/or digital form. For example, a video may include movies, image sequences from a camera or other observer, computer-generated image sequences, or the like, or a combination thereof. As used herein, a sequence (also referred to as a frame) may refer to a particular image or other discrete unit within a video. A video sensor may be implemented in a video camera. The video camera may include a color camera, a digital video camera, a camcorder, a PC camera, a webcam, an infrared (IR) video camera, a low-light video camera, a thermal video camera, a CCTV camera, a pan, a tilt, a zoom (PTZ) camera, a video sensing device, an Internet Protocol (IP) camera, or the like, or a combination thereof. The image may be a three-dimensional (3D) image or a two-dimensional (2D) image.

In some embodiments, the camera 102 may include camera processing circuits. The camera processing circuits may be configured to process data and/or information relating to the camera 102 in the present disclosure and/or control one or more components (e.g., the lens, the shutter) in the camera 102. For example, the camera processing circuits may automatically determine a value of the exposure parameter of the camera 102 such as an exposure time, an exposure gain, and an aperture size. The camera processing circuits may also adjust quality of images taken by the camera 102, such as the sharpness of the images. For another example, the camera processing circuits may determine whether a person is detected by the camera 102. In response to a determination that a person is detected, the camera processing circuits may capture a front face of the person using the camera 102. In some embodiments, the camera processing circuits may be local to or remote from the camera 102. For example, the camera processing circuits may communicate with the camera 102 via the network 112. As another example, the camera processing circuits may be integrated into the camera 102.

In some embodiments, the camera 102 may include a storage device. The storage device may store data, instructions, and/or any other information. In some embodiments, the storage device may store data obtained from the processing device. For example, the storage device may store captured images. In some embodiments, the storage device may store data and/or instructions that the processing device may execute or use to perform exemplary methods described in the present disclosure. In some embodiments, the storage device may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. Besides captured images, frame information, features extracted in the current invention, and some other intermediary date may be saved in the storage devices.

The server 103 may process data and/or information obtained from the camera 102, the network storage device 113, or the like. For example, the server 103 may obtain image data (e.g., an image, a video, etc.) from the camera 102 and/or the network storage device 113. The server 103 may track an object (e.g., a human face) based on the image data. For example, the server 103 may identify a human face corresponding to a person of interest in a frame. The server 103 may track human faces corresponding to the same person of interest in different frames based on position information of human faces in adjacent frames.

In some embodiments, the server 103 may obtain a video including a plurality of consecutive frames. For example, the server 103 may obtain the video from the camera 102, and/or the network storage device 113 via the network 112. The server 103 may identify face regions including human faces in a first frame of the video and track persons of interest corresponding to the human faces in later frames. For example, the server 103 may identify the face regions based on face detection algorithms, wherein each of the face regions is a face recognition box. The server 103 may track a person of interest in a current frame based on a percentage of overlapping area between a face region in the previous frame next to the current frame and a face region in the current frame.

In some embodiments, the person of interest may be at least partially blocked in the current frame and may not be tracked in the current frame based on the percentage of overlapping area. In response to a determination that a person of interest is not tracked in the current frame based on the percentage of overlapping area, the server 103 may determine a position related to the person of interest in the current frame using a correlation filter. The correlation filter may be constructed based on at least two face images corresponding to the person of interest (e.g., at least two frames each including a face region corresponding to the person of interest). The at least two face images may depict the person of interest in different postures and include more features of the face of the person of interest than a single face image. The server 103 may perform the correlation filter on a designated region in the current frame to determine similarity between the face regions corresponding to the person of interest in the at least two face images and the designated region according to the features. The similarity between the face region in one of the at least two face images and the designated region may include a plurality of similarities corresponding to different positions in the face region and that in the designated region, wherein each of the plurality of similarities indicates a similarity between image data at a position in the face region and that at a position in the designated region. The server 103 may determine the position related to the person of interest based on a position with the maximum similarity. The position related to the person of interest in the current frame may be used to track the person of interest in later frames of the current frame.

In some embodiments, in response to a determination that a person of interest cannot be tracked in a plurality of consecutive frames based on the percentage of overlapping areas, the server 103 may determine that the person of interest is disappeared in the video and may not need to be tracked anymore.

In some embodiments, the server 103 may be a workstation or server. For example, the server 103 may be a single server or a server group. The server group may be centralized or distributed. In some embodiments, the server 103 may be local or remote. For example, the server 103 may access information and/or data stored in the camera 102 and/or the network storage device 113 via the network 112. As another example, the server 103 may be directly connected to the camera 102 and/or the network storage device 113 to access stored information and/or data. In some embodiments, the server 103 may be implemented on a cloud platform. Merely by way of example, the cloud platform may include a private cloud, a public cloud, a hybrid cloud, a community cloud, a distributed cloud, an inter-cloud, a multi-cloud, or the like, or a combination thereof.

Before transmitting a video through the network 112, the video source 101 may send the video to the encoder 104 for encoding the video, or send the video to the buffer 106 through the buffer manager 105. For example, the video provided by the video source 101 may be relatively large in size (e.g., raw video data, video encoded with low compression rate), thus before the transmission the video source 101 may send the video to the encoder 104 for video compression. As another example, the video provided by the video source 101 may be proper in size, and the video source 101 may directly send the video to the buffer 106 through the buffer manager 105 for video transmission.

An encoder 104 may be a remote device from the video source 101 or a local device interpreted in the video source 101. It may encode the video provided by the video source 101 before the video is transmitted through the network 112. Through encoding, the video to be transmitted may be compressed and/or encrypted. For example, the encoder 104 may encode a video using an algorithm for video compression so that the cost (e.g., time cost, resource cost, financial cost) for transmitting the video may be significantly reduced. Alternatively or additionally, the encoder 104 may encode a video using an algorithm for video encryption so that the video may be transmitted safely and a user without permission may not watch the video. The encoder 104 may encode the video frame by frame and generate a plurality of encoded video frames. The encoder 104 may send the encoded video frame to the buffer 106 through the buffer manager 105. Alternatively or additionally, the buffer manager 105 may obtain the encoded video frame from the encoder 104. In some embodiments, the encoder 104 may encode the video to be transmitted using a Moving Picture Experts Group (MPEG) based encoding technique.

The video frames and/or images to be transmitted may be stored in the buffer 106 in a form of a video frame buffering queue, which may be managed by the buffer manager 105. The buffer 106 may use a queue based data structure for buffering the video to be transmitted.

The buffer 106 may be a storage device for buffering the video to be transmitted through the network 112. It may be a remote device from the video source 101 or a local device interpreted in the video source 101, such as the storage medium of the camera 102. The buffer 106 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM), such as a dynamic RAM (DRAM), a double date rate synchronous dynamic RAM (DDR SDRAM), a static RAM (SRAM), a thyristor RAM (T-RAM), and a zero-capacitor RAM (Z-RAM). Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc.

The transmitter 107 may transmit the video or video frames buffered in the buffer 106 to the network 112. The transmitter 107 may transmit video or video frames in response to instructions sent from the video provider 101, the buffer manager 105, the terminal 108, or the like, or a combination thereof. Alternatively or additionally, the transmitter 107 may spontaneously transmit video or video frames stored in the buffer 106. The transmitter 107 may transmit video or video frames through the network 112 to the terminal 108 though one or more network connections (wired and/or wireless).

In some embodiments, the transmitter 107 may be capable of determining the transmission performance of the network 112. For example, the transmitter 107 may monitor its data transmitted rate for determining the transmission performance.

The terminal 108 may receive the transmitted video and/or information related to the image of registrant through the network 112. The terminal 108 may decode (e.g., through a video player installed on the terminal 108) the transmitted video or video frames using a decoding algorithm and display the video to a user. The decoding algorithm may correspond to the encoding algorithm used by the encoder 104.

The terminal 108 may be various in forms. For example, the terminal 108 may include a mobile device 109, a tablet computer 110, a laptop computer 111, or the like, or any combination thereof. In some embodiments, the mobile device 109 may include, a wearable device, a mobile device, a virtual reality device, an augmented reality device, or the like, or any combination thereof. In some embodiments, the wearable device may include a bracelet, footgear, eyeglasses, a helmet, a watch, clothing, a backpack, a smart accessory, or the like, or any combination thereof. In some embodiments, the mobile device may include a mobile phone, a personal digital assistance (PDA), a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 108 may be part of a processing engine.

The network 112 may include any suitable network that can facilitate a transmission of a video provided by the video source 101 to the terminal(s) 108. The network 112 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 112 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 112 may include one or more network access points. For example, the network 112 may include wired and/or wireless network access points such as base stations and/or internet exchange points through which a video provided by the video source 101 may be transmitted to the terminal 108.

In some embodiments, the network 112 may include one or more network storage devices 113. The network storage device 113 may be a device for buffering or caching data transmitted in the network 112. The video or video frame transmitted by the transmitter 107 may be buffered or cashed in one or more network storage devices 113 before being received by the terminal 108. The image of registrant may be buffered or cashed in one or more network storage devices 113. The network storage device 113 may be a server, a hub, a gateway, or the like, or a combination thereof.

It may be noted that, one or more of the encoder 104, buffer manager 105, buffer 106 and transmitter may be a stand-alone device, or a module integrated into the video source 101 or another stand-alone device. For example, one or more of the encoder 104, buffer manager 105, buffer 106 and transmitter 107 may be integrated into the camera 102 or the server 103. As another example, the encoder 104, buffer manager 105, buffer 106 and transmitter 107 may be included in a video processing engine which may communicate with the video source 101 through direct wired connection, the network 112, or another network not shown. As a further example, the encoder 104 may be a stand-alone device (e.g., a computer or a server), while the buffer manager 105, buffer 106 and transmitter 107 may be included in another stand-alone device.

Figure 2:
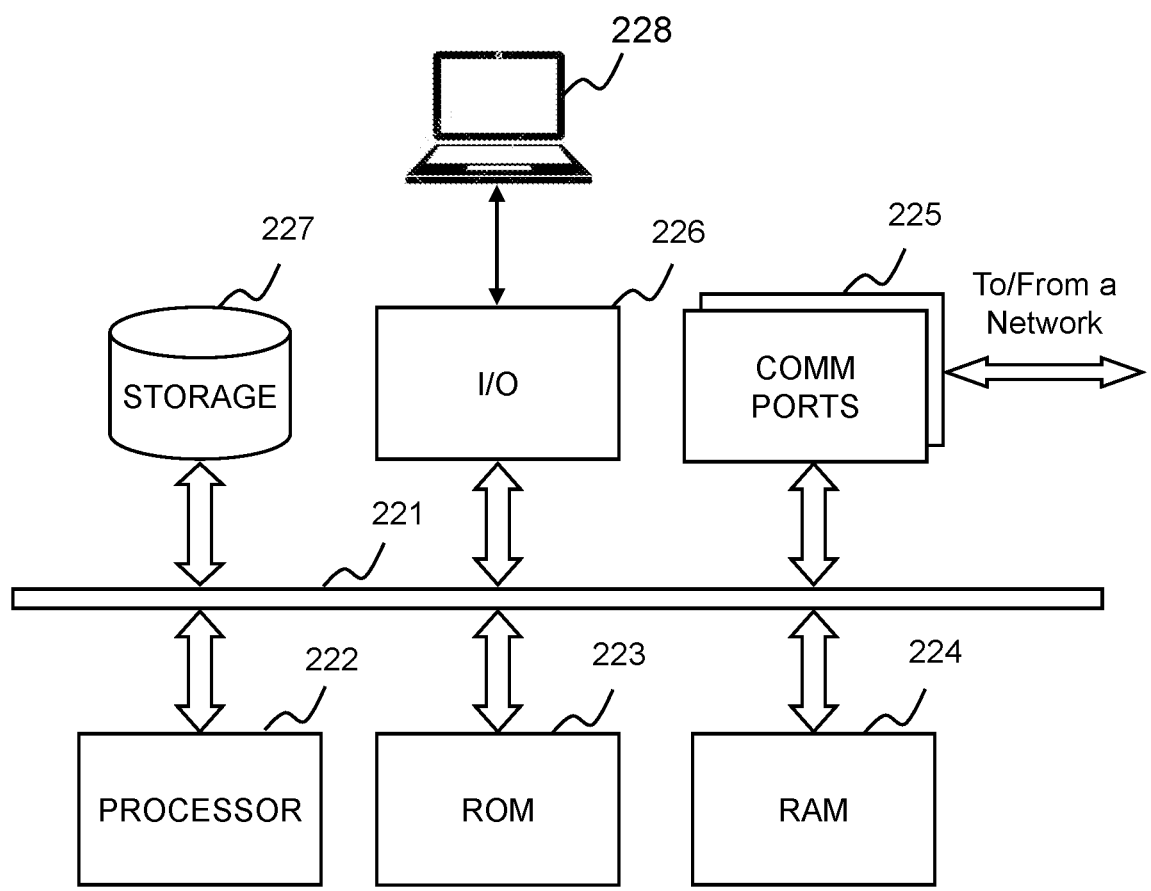
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. For example, the computing device 200 may be the server 103, the camera processing circuits of the camera 102, and/or an electronic device specialized in video or image processing. The encoder 104 and buffer manager 105 may also be implemented on the computing device 200. As illustrated in FIG. 2, the computing device 200 may include a processor 222, a storage 227, an input/output (I/O) 226, and a communication port 225.

The processor 222 (e.g., logic circuits) may execute computer instructions (e.g., program code) and perform functions in accordance with techniques described herein. For example, the processor 222 may include interface circuits and processing circuits therein. The interface circuits may be configured to receive electronic signals from a bus (not shown in FIG. 2), wherein the electronic signals encode structured data and/or instructions for the processing circuits to process. The processing circuits may conduct logical operations calculations, and then determine a conclusion, a result, and/or an instruction encoded as electronic signals. Then the interface circuits may send out the electronic signals from the processing circuits via the bus.

The computer instructions may include, for example, routines, programs, objects, components, data structures, procedures, modules, and functions, which perform particular functions described herein. In some embodiments, the processor 222 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 227 may store data/information obtained from the video source 101, the encoder 104, the buffer manager 105, the buffer 106, the transmitter 107, the terminal 108, the network 112, the network storage device 113, and/or any other component of the object tracking system 100. In some embodiments, the storage 222 may include a mass storage, removable storage, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random-access memory (RAM), which may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 222 may store one or more programs and/or instructions to perform exemplary methods described in the present disclosure.

The I/O 226 may input and/or output signals, data, information, etc. In some embodiments, the I/O 226 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 225 may be connected to a network (e.g., the network 112) to facilitate data communications. The communication port 225 may establish connections between the video source 101, the encoder 104, the buffer manager 105, the buffer 106, the transmitter 107, the terminal 108, the network 112, the network storage device 113, and/or any other component of the object tracking system 100. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or a combination thereof. In some embodiments, the communication port 2400 may be and/or include a standardized communication port, such as RS232, RS485, etc. In some embodiments, the communication port 225 may be a specially designed communication port.

Figure 3:
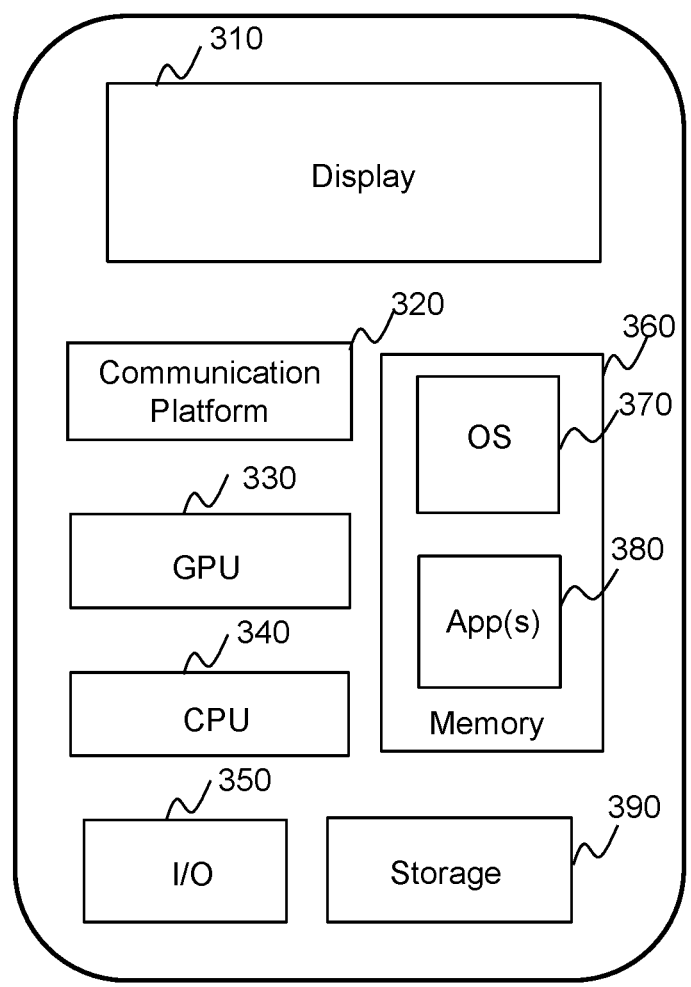
FIG. 3 is a schematic diagram illustrating exemplary components of an exemplary user device according to some embodiments of the present disclosure.

FIG. 3 is a schematic diagram illustrating exemplary components of an exemplary user device according to some embodiments of the present disclosure. As illustrated in FIG. 3, the user device 300 may include a communication platform 320, a display 310, a graphic processing unit (GPU) 330, a central processing unit (CPU) 330, an I/O port 350, a memory 360, and a storage 390. In some embodiments, any other suitable component, including but not limited to a system bus or a controller (not shown), may also be included in the user device 300. In some embodiments, a mobile operating system 370 (e.g., iOS™, Android™' Windows Phone™) and one or more applications 380 may be loaded into the memory 360 from the storage 390 in order to be executed by the processor 340. The user device 300 may be an embodiment of the terminal 108. The applications 380 may include a video player for receiving a video provided by the video source 101 through the network 112 and decode the received video.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
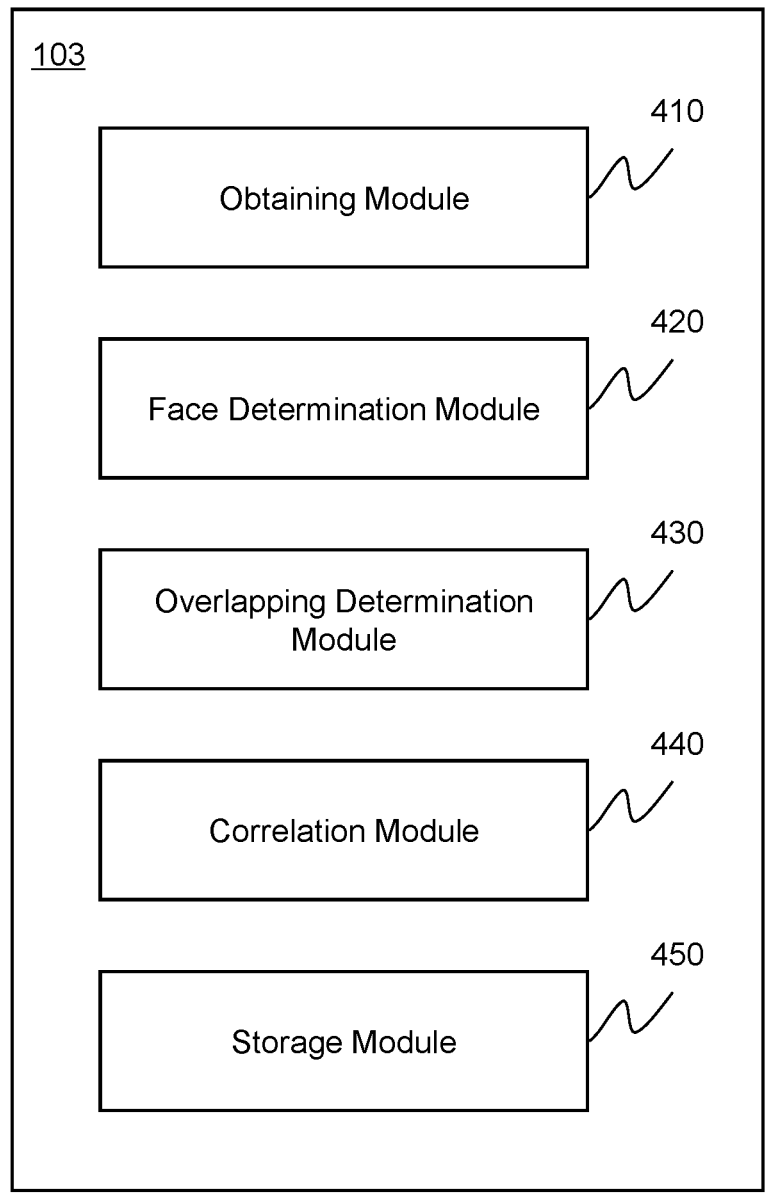
FIG. 4 is a block diagram of an exemplary server according to some embodiments of the present disclosure.

FIG. 4 is a block diagram of an exemplary server 103 according to some embodiments of the present disclosure. The server 103 may include an obtaining module 410, a face determination module 420, an overlapping determination module 430, a correlation module 440 and a storage module 450. The server 103 may include more or fewer components without loss of generality. For example, two of the modules may be combined into a single module, or one of the modules may be divided into two or more modules. As another example, one or more of the modules may reside on different computing devices (e.g., a desktop, a laptop, a mobile device, a tablet computer, a wearable computing device, or the like, or a combination thereof). As still another example, the server 103 may be implemented on the computing device 200 shown in FIG. 2.

Here and also throughout the present disclosure, a module may be implemented in many different ways and as hardware, software or in different combinations of hardware and software. For example, all or parts of a module implementations may be a processing circuitry that may include part or all of an instruction processor, such as a central processing unit (CPU), a microcontroller, a microprocessor; or an application specific integrated circuit (ASIC), a digital signal processor (DSP), a digital signal processing device (DSPD), a programmable logic device (PLD), a field programmable gate array (FPGA), a controller, other electronic components; or as circuitry that includes discrete logic or other circuit components, including an analog circuit component, a digital circuit component or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The obtaining module 410 may obtain information and/or data relating to tracking the object. For example, the obtaining module 410 may obtain a video including a plurality of consecutive frames. The video may be obtained from, for example, a live feed (e.g., the camera 102), a storage device (e.g., the network storage 113, the storage 227 of the computing device 228, the storage 390), an IEEE 1394-based interface, a video digitizer, a computer graphics engine, a network connection, or the like, or a combination thereof. The plurality of consecutive frames of the video may be in any image format, such as RAW format (referring to unprocessed or minimally processed image data), TIFF (Tagged Input File Format), JPEG (Joint Photographic Experts Group) format, GIF (Graphics Interchange Format), or BMP format (referring to bitmap format), and with any image resolution. In some embodiments, the video may be shot by a surveillance system configured to monitor an area of interest (AOI). The video may capture a plurality of objects in the plurality of consecutive frames. Some of the plurality of objects may be static objects, and the positions of the static objects may be the same in the plurality of consecutive frames. Some of the plurality of objects may be moving objects, and the positions of the moving objects may be different in at least two of the plurality of consecutive frames. The surveillance system may be configured to track one or more objects of interest based on positions of the one or more objects in the plurality of consecutive frames. In some embodiments, the plurality of consecutive frames may be time-continuous.

In some embodiments, the obtaining module 410 may transmit the images to other modules of the server 103 for further processing. For example, the obtaining module 410 may transmit the video to the face determination module 420 for determining one or more face regions for each frame of the video. As another example, the obtaining module 410 may transmit a current frame to the overlapping determination module 430 and/or the correlation module for tracking a person of interest. As still an example, the obtaining module 410 may transmit a frame to the storage module 450 for store in a local database or a remote database.

In some embodiments, the obtaining module 410 may obtain a current frame from the plurality of consecutive frames. The current frame may be a frame in which the object is to be tracked. In some embodiments, the obtaining module 410 may obtain at least two template frames from at least two previous frames of the current frame. The term "previous frame" in the present disclosure may refer to any frame that are obtained before the current frame, and may not be limited to a previous frame next to the current frame. The template frame may be a frame that includes a plurality of features of the object of interest. For example, in each of the at least two template frames, the object of interest may be identified. In some embodiments, the obtaining module 410 may obtain one or more tracked faces from a video including a plurality of consecutive frames. The one or more tracked faces may be faces of one or more persons of interest that being identified and tracked in one or more of the plurality of consecutive frames of the video. In some embodiments, the obtaining module 410 may obtain a person of interest corresponding to a tracked face.

The face determination module 420 may be configured to determine one or more face regions for each of the plurality of consecutive frames. Each of the one or more face regions may be an area including all features of a face of a person of interest. The one or more face regions may be configured to identify one or more persons of interest appear in the video. As used herein, one or more face regions of a frame may refer to position information of human faces in the frame and image data thereof. For example, the face determination module 420 may identify the one or more face regions of a frame based on face detection algorithms, wherein each of the one or more face regions of a frame is a face recognition box in the frame.

The face determination module 420 may be configured to determine one or more tracked faces for each of the plurality of consecutive frames, in addition to a first frame. The one or more tracked faces may be faces of one or more persons of interest that being identified and tracked in one or more of the plurality of consecutive frames of the video. For example, the face determination module 420 may determine one or more face regions of a current frame as one or more tracked faces of the later frame of the current frame. In some embodiments, the one or more tracked faces may be configured to track one or more persons of interest appear in the video. For the video as whole, the face determination module 420 may determine a corresponding tracked face set for each person of interest appears in the video. The tracked face set may include tracked faces of different frames corresponding to the same person of interest.

The overlapping determination module 430 may be configured to determine whether a face region correlates to a tracked face (whether the face region and the tracked face corresponds to a same person of interest). The overlapping determination module 430 may determine whether a face region correlates to a tracked face based on an overlapping area determination method. For example, if a percentage of overlapping area between the face region and the tracked face exceeds an overlapping threshold, the overlapping determination module 430 may determine that the face region correlates to the tracked face.

The correlation module 440 may be configured to identify a position related to an object of interest. For example, the correlation module 440 may identify a person of interest corresponding to a tracked face of a current frame using a correlation filter. The position may be used to identify the person of interest in one or more later frames of the current frame. In response to a determination that no face region has a relative high percentage of overlapping area (comparing with the overlapping threshold) with respect to a tracked face, the correlation module 440 may determine that the person of interest corresponding to the tracked face may be at least partially blocked or may disappear in the current frame and the position of the person of interest in the current frame may be determined using a correlation filter.

The correlation module 440 may identify the position related to a person of interest in the current frame based on the at least two template frames, using the correlation filter. In some embodiments, a template frame may be a frame that includes a plurality of features of the person of interest. The plurality of features of the object of interest may be characteristic parts of the person of interest. In some embodiments, the correlation module 440 may extract features of the person of interest in each of the at least two previous frames, and select at least two frames from the at least two previous frames as the at least two template frames. In some embodiments, the correlation module 440 may determine a matching period associated with the person of interest, and determine the at least two template frames based on the matching period. In some embodiments, the correlation module 440 may determine a searching region in the current frame based on a tracked face in a reference frame, and determine at least two candidate face regions based on the searching region and the at least two template frames using a correlation filter. The correlation module 440 may identify the position related to the person of interest based on the at least two candidate face regions and update the tracked face of the next frame.

The storage module 450 may be configured to store data, instructions, and/or any other information related to the video. For example, the storage module 450 may store the video, one or more face regions, one or more tracked faces, at least two template frames, or the like, or any combination thereof. In some embodiments, the storage module 450 may store data obtained from the server 103, the terminal 108, and/or the camera 102. In some embodiments, the storage module 450 may store data and/or instructions that the server 103 may execute or use to perform exemplary methods described in the present disclosure. In some embodiments, the storage module 450 may include a mass storage, a removable storage, a volatile read-and-write memory, a read-only memory (ROM), or the like, or a combination thereof. In some embodiments, the storage module 450 may be implemented on a cloud platform as described elsewhere in the disclosure. In some embodiments, the storage module 450 may be connected to and/or communicate with one or more other components in the server 103. One or more components in the server 103 may access the data or instructions stored in the storage module 450.

It should be noted that the above description of server 103 is merely provided for the purposes of illustration, and not intended to be understood as the only embodiment. For persons having ordinary skills in the art, various variations and modifications may be conduct under the teaching of some embodiments of the present disclosure. However, those variations and modifications may not depart from the protecting of some embodiments of the present disclosure.

Figure 5:
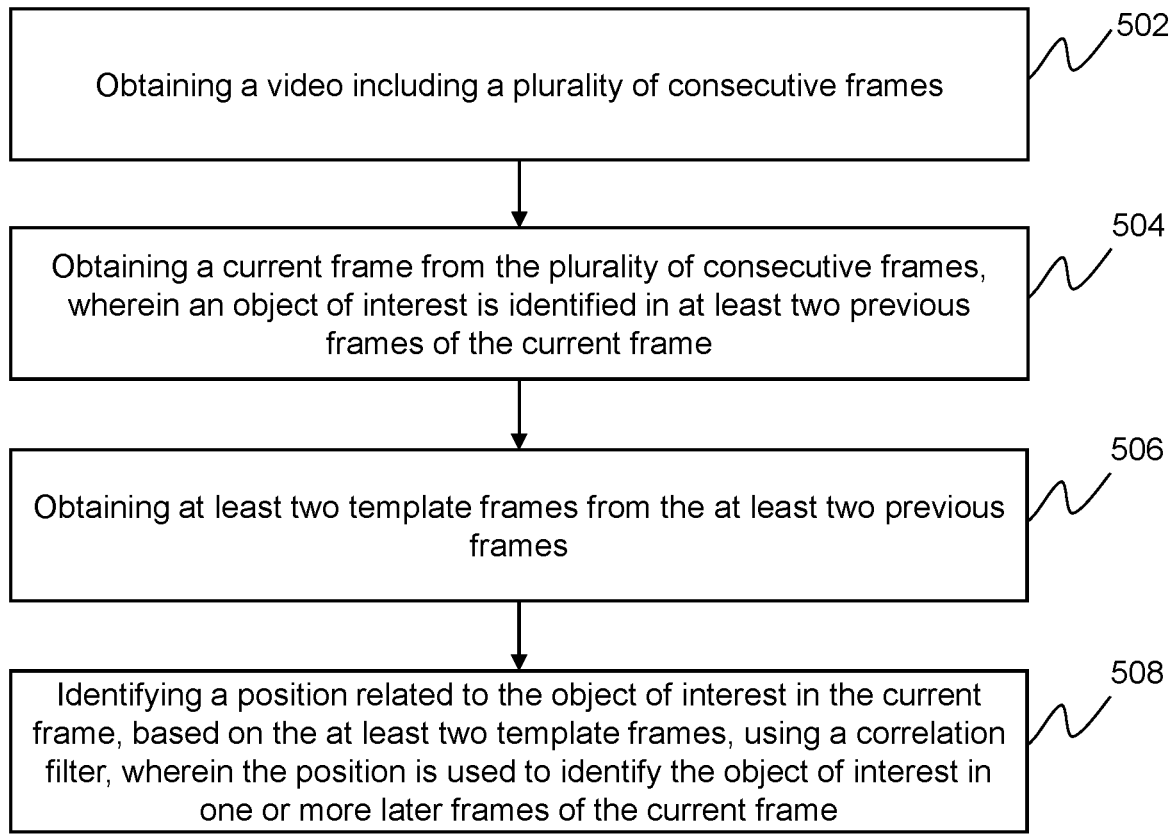
FIG. 5 is a flow chart illustrating an exemplary process for tracking an object according to some embodiments of the present disclosure.

FIG. 5 is a flow chart illustrating an exemplary process 500 for tracking an object according to some embodiments of the present disclosure. In some embodiments, the process 500 may be implemented on the object tracking system 100 as illustrated in FIG. 1. For example, the process 500 may be stored in a storage medium (e.g., the network storage device 113, or the storage 227 of the computing device 228) as a form of instructions, and invoked and/or executed by the server 103. The operations in the process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below may not be intended to be limiting.

In 502, the server 103 may obtain a video including a plurality of consecutive frames. The operation 502 may be performed by the obtaining module 410. In some embodiments, the video may be obtained from, for example, a live feed (e.g., the camera 102), a storage device (e.g., the network storage 113, the storage 227 of the computing device 228, the storage 390), an IEEE 1394-based interface, a video digitizer, a computer graphics engine, a network connection, or the like, or a combination thereof. For example, the server 103 may obtain the video from the encoder 104. For another example, the server 103 may acquire the video from a stationary video sensor (e.g., the camera 102) working in a surveillance state. The plurality of consecutive frames of the video may be in any image format, such as RAW format (referring to unprocessed or minimally processed image data), TIFF (Tagged Input File Format), JPEG (Joint Photographic Experts Group) format, GIF (Graphics Interchange Format), or BMP format (referring to bitmap format), and with any image resolution.

In some embodiments, the camera 102 working in a surveillance state may be a portion of a surveillance system configured to monitor an area of interest (AOI). The video shot by the camera 102 may capture a plurality of objects in the plurality of consecutive frames. The plurality of objects may include a person (e.g., a face of the person), a vehicle, an item, or the like, or a combination thereof. Some of the plurality of objects may be static objects, and the positions of the static objects may be the same in the plurality of consecutive frames. Some of the plurality of objects may be moving objects, and the positions of the moving objects may be different in at least two of the plurality of consecutive frames. The surveillance system may be configured to track one or more objects of interest based on positions of the one or more objects in the plurality of consecutive frames. In some embodiments, the plurality of consecutive frames may be time-continuous.

In 504, the server 103 may obtain a current frame from the plurality of consecutive frames. The operation 504 may be performed by the obtaining module 410. In some embodiments, the server 103 may obtain each of the plurality of consecutive frames in a chronological order. For example, the server 103 may obtain a frame according to a time point when the frame is shot, the earlier the frame is shot, the sooner the frame is obtained. In some embodiments, the current frame may be any one frame the plurality of consecutive frames. In the current frame, the object of interested may be tracked. For example, in the current frame, the object of interested may be identified. Alternatively, in the current frame, the object of interest may be blocked and may not be identified. In some embodiments, the current frame may be determined in connection with the operation 616 in FIG. 6. In some embodiments, an object of interest may be identified in at least two previous frames of the current frame. For example, before the current frame, there are 10 previous frames. The object of interest may be identified in at least two of the 10 previous frames. Alternatively, the object of interest may be identified in only one previous frame of the current frame. For example, before the current frame, there is only one previous frame, and the object of interest may be identified in the only one previous frame. The term "previous frame" in the present disclosure may refer to any frame that are obtained before the current frame, and may not be limited to a previous frame next to the current frame.

As used herein, identifying an object of interest in a frame may refer to determining a position of the object of interest in the frame. The object of interest may be a moving object and the positions of the moving object in different frames may vary. In some embodiments, the position of the object of interest may be determined based on an overlapping area determination method. Detailed descriptions regarding the overlapping area determination method may be found elsewhere in the present disclosure (e.g., FIG. 6 and the descriptions thereof). In some embodiments, the position of the object of interest may be determined based on a correlation filter (also referred to as an active tracking method). Detailed descriptions regarding the active tracking method may be found elsewhere in the present disclosure (e.g., FIG. 7 and the descriptions thereof).

In 506, the server 103 may obtain at least two template frames from the at least two previous frames. The operation 506 may be performed by the obtaining module 410. In some embodiments, a template frame may be a frame that includes a plurality of features of the object of interest. The plurality of features of the object of interest may be characteristic parts of the object of interest. For example, the plurality of features may include one or more components of the object of interest, a shape of the object of interest (or shapes of one or more components of the object of interest), a size of the object of interest (or sizes of one or more components of the object of interest), or the like, or any combination thereof. In some embodiments, each of the at least two template frames may include different features of the object of interest. For example, the object of interest in each of the at least two template frames may have different morphologies or different postures. In some embodiments, the server 103 may extract features of the object of interest in each of the at least two previous frames, and select at least two frames from the at least two previous frames as the at least two template frames. In some embodiments, the server 103 may first select at least two frames from the at least two previous frames as the at least two template frames, and then extract features of the object of interest in each of the at least two template frames.

In some embodiments, the at least two previous frames may be at least two consecutive frames. The object of interest may be identified in each of the at least two consecutive frames based on the overlapping area determination method. In some embodiments, the at least two previous frames may be also referred to as a matching frame set of the object of interest, wherein the at least two previous frames may be arranged in a chronological order in the matching frame set. A time period within which the matching frame set are shot may be referred to as a matching period. Detailed descriptions regarding the matching period may be found elsewhere in the present disclosure (e.g., in FIG. 7, and the descriptions thereof).

In some embodiments, the server 103 may select a first frame and a last frame of the matching frame set as a portion or all of the at least two template frames. Taking a matching frame set of 5 as an example, the server 103 may select the first and the fifth frame in the matching frame set as the at least two template frames. As another example, the server 103 may also select the first, the third, and the fifth frame in the matching frame set as the at least two template frames. In some embodiments, the number of the template frames may be a default setting of the object tracking system 100, or may be adjustable under different situations. For example, the number of the template frames may be a constant number (e.g., 2, 3, 4). In case that the number of frames in the matching frame is less than the number of the template frames, the server 103 may determine the number of frames in the matching frame as the number of the template frames. For example, when the matching frame set includes only one frame and the number of template frames is 3. The server 103 may select the only one frame as the template frame.

In 508, the server 103 may identify a position related to the object of interest in the current frame. In some embodiments, the server 103 may identify the position based on the at least two template frames using a correlation filter. In some embodiments, the position may further be used to identify the object of interest in one or more later frames of the current frame. The operation 508 may be performed by the obtaining module 410. In some embodiments, the position related to the object of the interest in the current frame may be a predicted position of the object of interest in the current frame. The server 103 may track the object of interest based on the position. Exemplary correlation filtering algorithms may include a Circulant Structure of Tracking-by-detection with Kernels algorithm (CSK), a Spatio- Temporal Context Learning algorithm (STC), a Kernelized Correlation Filters algorithm (KCF), a Discriminative Correlation Filter algorithm (DCF), a Discriminative Scale Space Tracking Filter algorithm (DSST), a Scale Adaptive with Multiple Features algorithm (SAMF), a Minimum Output Sum of Squared Error algorithm (MOSSE), a MUlti-StoreTracker algorithm (MUSTer), or the like, or any combination thereof. For example, the server 103 may use image data of the object of interest in the at least two template frame, position information of the object of interest in a previous frame next to the current frame, and the current frame as inputs of the correlation filter to obtain at least two outputs. Each output may correspond to one of the at least two template frame. Each output may refer to a position (e.g., a point) in the current frame. The image data of the current frame at the position may have a maximum response with image data of a template frame depicting the object of interest. Detailed descriptions regarding the identification of the position related to the object of interest in a frame, based on the at least two template frames, using a correlation filter may be found elsewhere in the present disclosure (e.g., in FIG. 7, and the descriptions thereof).

It should be noted that the above description of process 500 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, one or more other optional operations (e.g., a storing operation) may be added in the exemplary process 500. In the storing operation, the server 103 may store the video, the at least two template frames, the position related to the object of interest in any storage device (e.g., the network storage device 113, or the storage 227 of the computing device 228) disclosed elsewhere in the present disclosure.

Figure 6:
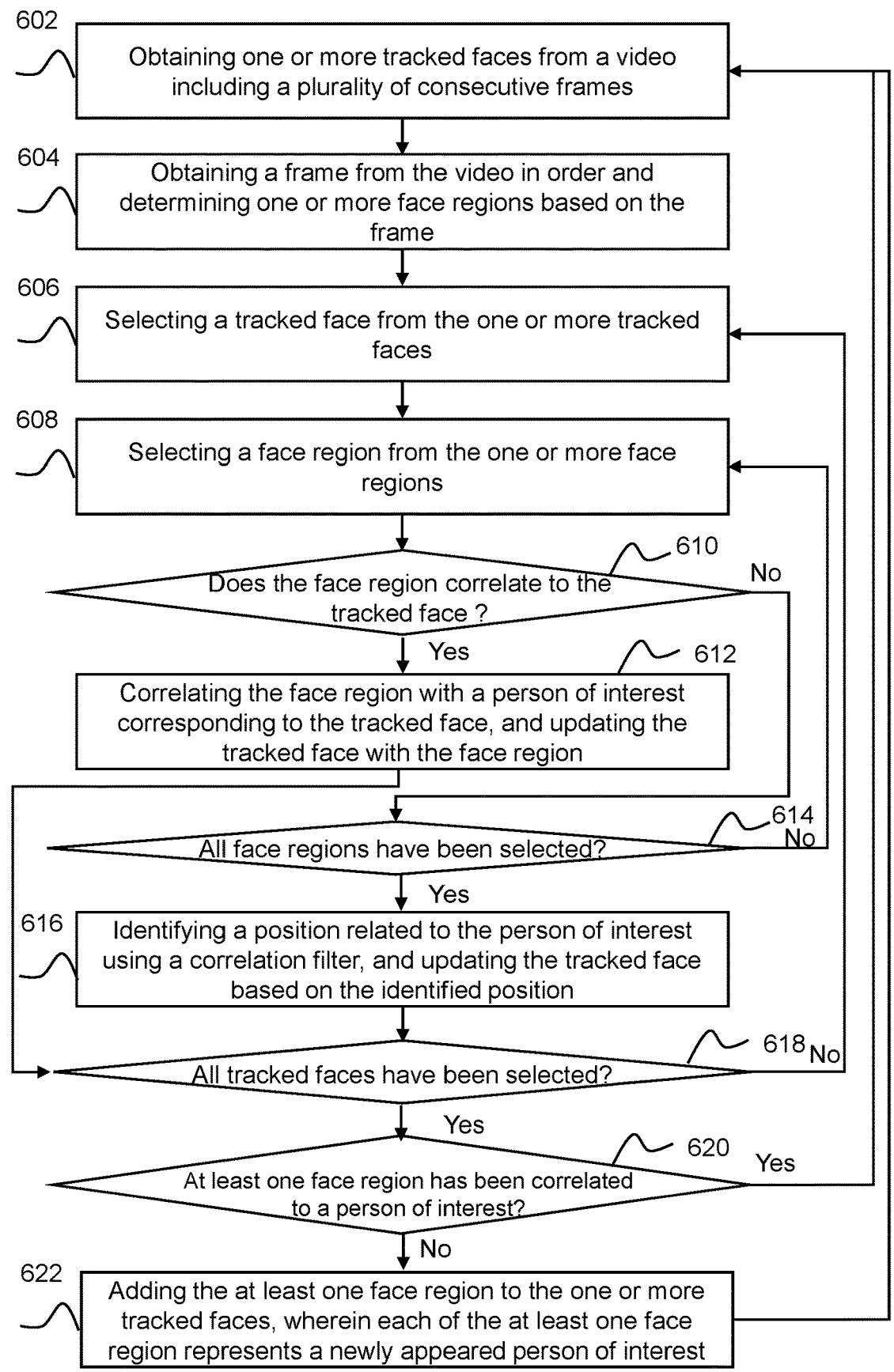
FIG. 6 is a flow chart illustrating an exemplary process for tracking an object according to some embodiments of the present disclosure.

FIG. 6 is a flow chart illustrating an exemplary process 600 for tracking an object according to some embodiments of the present disclosure. In some embodiments, the process 600 may be implemented on the object tracking system 100 as illustrated in FIG. 1. For example, the process 600 may be stored in a storage medium (e.g., the network storage device 113, or the storage 227 of the computing device 228) as a form of instructions, and invoked and/or executed by the server 103. The operations in the process 600 presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below may not be intended to be limiting.

In 602, the server 103 may obtain one or more tracked faces from a video including a plurality of consecutive frames. The operation 602 may be performed by the obtaining module 410. The one or more tracked faces may be faces of one or more persons of interest that being identified and tracked in one or more of the plurality of consecutive frames of the video. In some embodiments, the one or more tracked faces may be configured to track one or more persons of interest appear in the video. In addition to a first frame of the video, each of the plurality of consecutive frames may have one or more corresponding tracked faces as one or more tracked faces of a frame are determined based on a previous frame next to the frame. Each of the one or more tracked faces of a frame may correspond to a person of interest that needs to be tracked (also referred to as a tracking target) in the frame. For the video as whole, the server 103 may determine a corresponding tracked face set for each person of interest appears in the video. The tracked face set may include tracked faces of different frames corresponding to the same person of interest. Based on tracked face sets, the server 103 may track one or more persons of interest in the video by determining a position of each person of interest (e.g., a position of a face of each person of interest) in the plurality of consecutive frames.

As used herein, one or more tracked faces of a current frame may include position information of one or more human faces in a previous frame next to the current frame and image data thereof. For example, the first frame may have no tracked faces as there is no previous frame with respect to the first frame. In some embodiments, the position information of a human face in a frame may represent the position of a face recognition box depicting the human face in the frame. For example, the position information of a human face may be coordinates of the face recognition box of the human face. The face recognition box may be determined based on a face detection algorithm. The face detection algorithm may be configured to extract all the faces from an image and determine the locations of the faces. Exemplary face detection algorithms may include Hough transform methods, a Reisfeld's symmetry operator Kernel, a Direct Discriminant Analysis algorithm, a Features Extracted from Walshlet Pyramid, a Hybrid Color and Frequency Features Approach, a Multilevel Block Truncation Coding Approach, a Partial Least Square Based Method, a Vilola-Jones object detection framework, a Deformable Part Model (DPM), a Support vector machines (SVM), or the like, or any combination thereof. In some embodiments, the position information of a human face in a frame may be determined based on a correlation filter.

Taking the first frame in the video as an example, assuming that two face recognition boxes are identified in the first frame, the server 103 may determine the position information of the two identified face recognition boxes as two tracked faces of a second frame of the video. The first tracked face of the second frame may include the position information of a first face recognition box (corresponding to a first person of interest) of the first frame, and the second tracked face of the second frame may include the position information of a second face recognition box (corresponding to a second person of interest) of the first frame.

In some embodiments, instead of tracking all persons appear in the video, the server 103 may designate one or more person appearing in the video as one or more persons of interest and determine face regions corresponding to the one or more persons of interests as the one or more tracked faces. In some embodiments, the one or more tracked faces may be stored in any storage device (e.g., the network storage device 113, or the storage 227 of the computing device 228) after obtaining the one or more tracked faces. In some embodiments, the server 103 may label each of the one or more tracked faces with a traced ID.

In 604, the server 103 may obtain a frame from the video in order and determine one or more face regions based on the frame. The operation 604 may be performed by the obtaining module 410. The server 103 may obtain the frame in a chronological order. Each of the one or more face regions may be an area including all features of a face of a person of interest. The one or more face regions may be configured to identify one or more persons of interest appear in the video. Each of the plurality of consecutive frames may have one or more face regions. Each of the one or more face regions of a frame may correspond to a person of interest that appears in the frame. As used herein, one or more face regions of a frame may refer to position information of human faces in the frame and image data thereof. The server 103 may determine the position information of a human face in the frame by determining a face recognition box depicting the human face in the frame. For example, the server 103 may determine position of a face recognition box in the frame and the human face in the frame as a face region in a frame. As another example, the server 103 may extract face features of a person of interest, and determine an area including all or parts of the extracted face features as a face region in a frame. In some embodiments, the one or more face regions may be stored in any storage device (e.g., the network storage device 113, or the storage 227 of the computing device 228) after determining the one or more face regions. In some embodiments, the server 103 may label each of the one or more face regions with a face ID.

In 606, the server 103 may select a tracked face from the one or more tracked faces. The operation 606 may be performed by the face determination module 420. In some embodiments, the server 103 may select the tracked face from the one or more tracked faces according to a predetermined rule. For example, the server 103 may select the tracked face from the one or more tracked faces according to the tracked ID of each of the one or more tacked faces. As another example, the server 103 may select the tracked face from the one or more tracked faces according to a storing order stored in the storage.

In 608, the server 103 may select a face region from the one or more face regions. The operation 608 may be performed by the face determination module 420. In some embodiments, the server 103 may select the face region from the one or more face regions according to a predetermined rule. For example, the server 103 may select the face region from the one or more face regions according to the face ID of each of the one or more face regions. As another example, the server 103 may select the face region from the one or more face regions according to a storing order stored in the storage.

In 610, the server 103 may determine whether the face region correlates to the tracked face. The operation 610 may be performed by the overlapping determination module 430. The server 103 may determine whether the face region correlates to the tracked face according to an overlapping area determination method. For example, if a percentage of overlapping area between the face region and the tracked face exceeds an overlapping threshold, the server 103 may determine that the face region correlates to the tracked face. In some embodiments, the overlapping threshold may be default settings of the object tracking system 100, or may be adjustable under different situations. For example, the overlapping threshold may be 25%, 50%, 95%, etc. In response to a determination that the face region correlates to the tracked face, the process 600 may proceed to 612; otherwise, the process 600 may proceed to operation 614.

In some embodiments, the percentage of overlapping area between the face region and the tracked face may be denoted by Equation (1) as follows:

$$P = \frac{area_o}{area_F + area_T}, \quad (1)$$

where P refers to the percentage of overlapping area between the face region and the tracked face, $area_o$ refers to the overlapping area between the face region and the tracked face, $area_F$ refers to the area of the face region, $area_T$ refers to the area of the tracked face.

In some embodiments, the percentage of overlapping area between the face region and the tracked face may be denoted by Equation (2) as follows:

$$P = \frac{area_o}{area_F + area_T - area_o}. \quad (2)$$

The server 103 may determine the overlapping area between the face region and the tracked face by placing the tracked face (e.g., a region of the tracked face) on the current frame according to the position information of the tracked face. The server 103 may determine the area of an overlapping portion between the placed tracked face and the face region as the overlapping area between the face region and the tracked face. In some embodiment, the server 103 may determine the area of a portion of a frame by counting the number of pixels inside the portion of the frame. For example, the server 103 may determine the number of pixels of the tracked face with a same position as pixels of the face region as the overlapping area between the face region and the tracked face.

In 612, the server 103 may correlate the face region with a person of interest corresponding to the tracked face. The server 103 may further update the tracked face with the face region. The operation 612 may be performed by the overlapping determination module 430. In response to a determination that the percentage of overlapping area between the face region and the tracked face exceeds the overlapping threshold, the server 103 may determine that the person of interest corresponding to the tracked face may be still in the current frame and the person of interest may move by little from the previous frame next to the current frame to the current frame. As used herein, a person of interest corresponding to a tracked face means that the image data of the tracked face depicts the person of interest. The server 103 may update the tracked face with the face region by determining the face region of the current frame as the tracked face of a later frame next to the current frame.

In 614, in response to a determination that the face region does not correlate to the tracked face, the server 103 may determine whether all face regions have been selected. The operation 614 may be performed by the face determination module 420. In response to a determination that all face regions have been selected, the process 600 may proceed to 616; otherwise, the process 600 may proceed to operation 608. In some embodiments, in response to a determination that not all face regions have been selected, the server 103 may select another face region in the frame to determine whether the selected another face region correlates to the selected tracked face in 606 based on the overlapping area determination method. By performing 608, 610, and 614, the server 103 may determine whether each face region in the frame correlates to one of the tracked faces in the previous frame next to the frame based on the overlapping area determination method.

In 616, the server 103 may identify a position related to the person of interest using a correlation filter. The server 103 may further update the tracked face based on the identified position. The operation 616 may be performed by the correlation module 440. In response to a determination that no face region has a relative high percentage of overlapping area (comparing with the overlapping threshold) with respect to the tracked face, the server 103 may determine that the person of interest corresponding to the tracked face may be at least partially blocked or may disappear in the current frame and the position of the person of interest in the current frame may be determined using a correlation filter. Detailed descriptions regarding the identification of the position related to the person of interest using a correlation filter may be found elsewhere in the present disclosure (e.g., FIG. 7, and the descriptions thereof). In some embodiments, the server 103 may update the tracked face with the identified position as the tracked face of a later frame next to the current frame.

In 618, the server 103 may determine whether all tracked faces have been selected. The operation 618 may be performed by the face determination module 420. In response to a determination that all tracked faces have been selected, the process 600 may proceed to 620; otherwise, the process 600 may proceed to operation 606. By performing back to 606, the server 103 may determine whether each tracked face is correlated to one of the face regions in the frame.

In 620, the server 103 may determine whether at least one face region of all face regions have been correlated to a person of interest. The operation 620 may be performed by the face determination module 420. In response to a determination that all tracked faces have been selected, the process 600 may proceed to 602; otherwise, the process 600 may proceed to operation 622. By performing back to 602, the server 103 may proceed to a next frame to track objects.

In 622, in response to a determination that at least one face region has not been correlated to a person of interest, the server 103 may add the at least one face region to the one or more tracked faces. In some embodiments, each of the at least one face region that has not been correlated to a person of interest represents a newly appeared person of interest. The operation 622 may be performed by the face determination module 420. In response to a determination that at least one face region has not been correlated to any one of the persons of interest corresponding to the one or more tracked faces of the current frame, the server 103 may determine that the at least one face region corresponds to a person of interest who appears in the video for the first time. The server 103 may determine the person of interest corresponding to the at least one face region as a new tracking target. For each of the at least one face regions, the server 103 may create a new tracked face, wherein the newly created tracked face includes the position information of a face region corresponding to a newly appeared person of interest and the image data thereof. After 622, the server 103 may proceed to a next frame to track objects by performing back to 602.

For illustration purposes, the present disclosure takes a single frame as an example, it should be noted that the server 103 may perform the process 600 on each of the plurality of consecutive frames in addition to the first frame. For example, the process 600 may be performed again on the next frame of the current frame in response to a determination the current frame is not the last frame in the video. For example, the server 103 may obtain one or more new tracked faces updated based on the current frame (i.e., the one or more tracked faces of the next frame) and process the next frame according to the process 600.

It should be noted that the above description of process 600 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. In the storing operation, the server 103 may store the one or more tracked faces, the one or more face regions, the position related to the object of interest in any storage device (e.g., the network storage device 113, or the storage 227 of the computing device 228) disclosed elsewhere in the present disclosure. It should be noted that a person of interest is merely an example of the object of interest, other objects, such as a vehicle, an item, etc., may also be tracked as an object of interest. And a face of the person of interest is also merely an example of a feature of the person of interest, other features, such as a body, legs, or any other components of the person may also be tracked.

Figure 7:
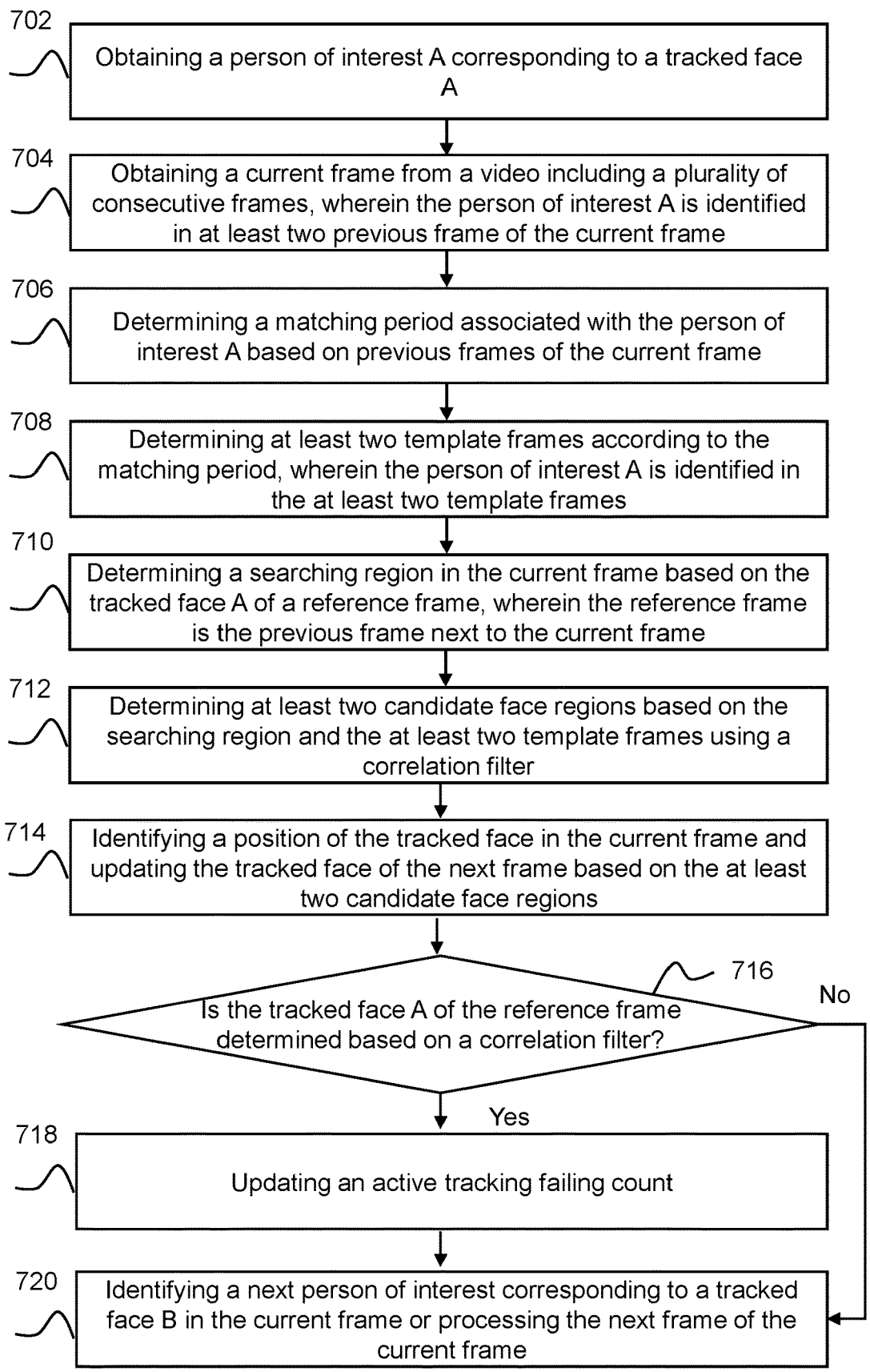
FIG. 7 is a flow chart illustrating an exemplary process for tracking an object based on a correlation filter according to some embodiments of the present disclosure.

FIG. 7 is a flow chart illustrating an exemplary process 700 for tracking an object based on a correlation filter according to some embodiments of the present disclosure. In some embodiments, the process 700 may be implemented on the object tracking system 100 as illustrated in FIG. 1. For example, the process 700 may be stored in a storage medium (e.g., the network storage device 113, or the storage 227 of the computing device 228) as a form of instructions, and invoked and/or executed by the server 103. The operations in the process 600 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below may not be intended to be limiting.

In 702, the server 103 may obtain a person of interest A corresponding to a tracked face A. The operation 702 may be performed by the obtaining module 410. The server 103 may track the person of interest A in the video based on the tracked face A.

In 704, the server 103 may obtain a current frame from a video including a plurality of consecutive frames. In some embodiments, the person of interest A may be identified in at least two previous frame of the current frame. The operation 704 may be performed by the obtaining module 410. In some embodiments, the tracked face A of the current frame may be the same as a situation illustrated in operation 616, and the person of interest A may be at least partially blocked or disappearing in the current frame. No face region corresponding to the person of interest A may be identified in the current frame based on the overlapping area determination method.

In 706, the server 103 may determine a matching period associated with the person of interest A based on previous frames of the current frame. The operation 706 may be performed by the correlation module 440. As described in connection with FIG. 5, the matching period may be a time period within which a matching frame set are shot. A matching frame set of the person of interest A may include at least one consecutive frame, and the person of interest A may be identified in each of the at least one consecutive frame based on the overlapping area determination method. The first frame of the video may be an exception. For example, when a person of interest is identified in the second to the fifth frames of the video based on the overlapping area determination method, the server 103 may determine the first to fifth frames as the matching frame set. In some embodiments, the server 103 may determine the matching period according to the process 600. For example, the server 103 may mark a tracked face determined in operation 616 with an overlapping area label and determine that the person of interest corresponding to the tracked face determined in operation 616 is identified in the current frame based on the overlapping area determination method. The server 103 may determine the matching period based on the overlapping area labels of the plurality of consecutive flames. When a person of interest is identified in the second to the eighth frames of the video and only the third to the sixth frames and the eighth frame have the overlapping area labels, the server 103 may determine the third to the sixth frames as the matching frame set. The server 103 may exclude the eighth frame from the matching frame set as the eighth frame is not consecutive with respect to the sixth frame.

In 708, the server 103 may determine at least two template frames according to the matching period. In some embodiments, the person of interest A may be identified in the at least two template frames. The operation 708 may be performed by the correlation module 440. In some embodiments, the server 103 may select the at least two template frames in the matching period. For example, the server 103 may select a first frame, a middle frame, and a last frame in the matching period as the at least two template frames. As another example, the server 103 may select a first frame and a last frame in the matching period as the at least two template frames. As still another example, the server 103 may process each frame in the matching period, and select two or more frames that including different features and/or morphologies as the at least two template frames. Detailed descriptions regarding the determination of the at least two template frames may be found elsewhere in the present disclosure (e.g., in FIG. 5, and the descriptions thereof).

In 710, the server 103 may determine a searching region in the current frame based on the tracked face A of a reference frame. The reference frame may be the previous frame next to the current frame. The operation 710 may be performed by the correlation module 440. The server 103 may determine the searching region based on the position information of the tracked face A. For example, the searching region may be an enlarged face recognition box in the current frame with respect to the face recognition box corresponding to the tracked face A of the reference frame, wherein the centers of two face recognition boxes are at the same position. As used herein, a first point in a first frame and a second point in a second being at the same position may refer to that when overlapping the two frames, the first point and the second point overlapping. In some embodiments, the server 103 may determine the searching region based on an enlargement degree. The enlargement degree may be default settings of the object tracking system 100, or may be adjustable under different situations. For example, the enlargement degree may be 1.5, 2, 2.5, etc.

In 712, the server 103 may determine at least two candidate face regions based on the searching region and the at least two template frames using a correlation filter. The operation 712 may be performed by the correlation module 440. In some embodiments, the server 103 may determine a candidate face region for each of the at least two template frames. Taking a template frame as an example, the server 103 may input the searching region of the current frame into the correlation filter to obtain an output of position information of a response point, wherein the correlation filter is constructed based on the face region corresponding to the person of interest A of the template frame. The response point may refer to as a center position, wherein the image data of the response point has a maximum response with the image data of the template frame depicting the person of interest A (e.g., image data of the face region). The server 103 may determine the response point as a center of a candidate face region.

Exemplary correlation filtering algorithms may include a Circulant Structure of Tracking-by-detection with Kernels algorithm (CSK), a Spatio-Temporal Context Learning algorithm (STC), a Kernelized Correlation Filters algorithm (KCF), a Discriminative Correlation Filter algorithm (DCF), a Discriminative Scale Space Tracking Filter algorithm (DSST), a Scale Adaptive with Multiple Features algorithm (SAMF), a Minimum Output Sum of Squared Error algorithm (MOSSE), a MUlti-Store Tracker algorithm (MUSTer), or the like, or any combination thereof. For example, the server 103 may use a correlation filter determined based on the KCF. The KCF may be an iterative localization procedure based on the maximization of a similarity measure. The server 103 may sample the face region of the template frame and train a regression model based on the sampled data. The regression model may determine a response value for each pixel of inputted image data. The server 103 may input image data of the searching region into the regression model and determine a pixel with the maximum response as a center of the candidate face region.

In some embodiments, the server 103 may extract a set of features, the set of features related to eyes, a nose, ears, hair, a mouth, or the like, or any combination thereof. The server 103 may determine the similarity between image data of the face region of the template frame and that of the searching region with respect to the set of features using the correlation filter. The output of the correlation filter may indicate a center position corresponding to image data with the highest similarity.

In 714, the server 103 may identify a position of the tracked face in the current frame and update the tracked face of the next frame based on the at least two candidate face regions. The operation 714 may be performed by the correlation module 440. In some embodiment, the server 103 may update the tracked face based on a candidate face region with the maximum response. For example, the server 103 may determine the position information of the tracked face as position information of a box centered on the candidate face region with the maximum response. In some embodiments, the server 103 may update the tracked face based on an average of the at least two candidate face regions. For example, the server 103 may determine the position information of the tracked face as position information of a box centered on the average of the at least two candidate face regions. The size of the box may be default settings of the object tracking system 100, or may be adjustable under different situations. For example, the server 103 may determine the size of the box based on sizes of face regions of the at least two template frames.

In 716, the server 103 may determine whether the tracked face A of the reference frame is determined based on a correlation filter. The operation 716 may be performed by the correlation module 440. In some embodiments, the tracked face A of the reference frame may be determined based on the overlapping area determination method and the tracked face A of the reference frame may be marked with an overlapping area label. In some embodiments, the tracked face A of the reference frame may be determined based on the correlation filter. The server 103 may determine that the tracked face A of the reference frame is determined based on the correlation filter if the tracked face A of the reference frame does not have the overlapping area label. In response to a determination that the tracked face A of the reference frame is determined based on the correlation filter, the process 700 may proceed to 718; otherwise, the process 700 may proceed to operation 720.

In 718, the server 103 may update an active tracking failing count. The operation 718 may be performed by the correlation module 440. The active tracking failing count may be configured to count the number of tracked faces determine based on the correlation filter in a tracked face set. In some embodiments, the server 103 may determine whether the active tracking failing count exceeds an active tracking threshold. In response to a determination that the active tracking failing count exceeds an active tracking threshold, the server 103 may determine that the position related to a person of interest determined using the correlation filter may not be accurate enough to indicate the position of the person of interest in later frames. In some embodiments, in response to the determination that the active tracking failing count exceeds an active tracking threshold, the server 103 may determine that the person of interest may disappear in the current frame of the video. The server 103 may delete the corresponding tracked face set in response to a determination that the active tracking failing count of the tracked face set exceeds an active tracking threshold. In some embodiments, the active tracking threshold may indicate that the tracked face A of the person of interest A has been disappeared for a long time in the video. The server 103 may delete the tracked face A of the person of interest A from the storage of the system 100. The active tracking threshold may be default settings of the object tracking system 100, or may be adjustable under different situations. For example, the active tracking threshold may be 5, 7, 10, etc.

In 720, the server 103 may identify a next person of interest corresponding to a tracked face B in the current frame or processing the next frame of the current frame. The operation 720 may be performed by the correlation module 440.

It should be noted that the above description of process 700 is merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. For example, instead of determining a center position as the candidate face region, the server 103 may determine a region with values of response exceeding a response threshold as the candidate face region.

Figure 8:
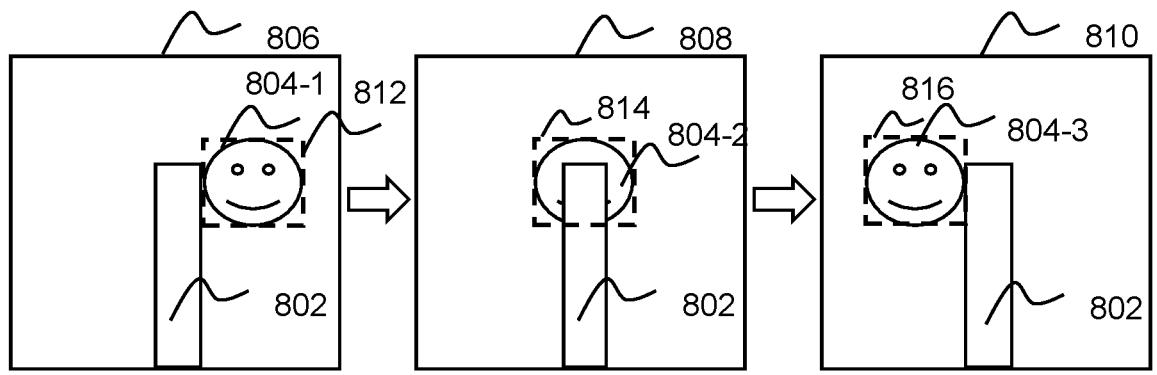
FIG. 8 is a schematic diagram illustrating an exemplary process for tracking a person of interest on three consecutive frames according to some embodiments of the present disclosure.

FIG. 8 is a schematic diagram illustrating an exemplary process for tracking a person of interest on three consecutive frames according to some embodiments of the present disclosure.

Three consecutive frames 806, 808, and 810 are shown in FIG. 8. In the first frame 806, a person of interest 804-1 may be identified using a face recognition method. For example, the server 103 may determine a face region 812 in the first frame 806. The server 103 may determine the face region 812 in the first frame 806 as a tracked face in the second frame 808. In the frame 808, the person of interest 804-2 may be blocked by a static blocking item 802 and may not be identified by the server 103 as a face region. The server 103 may not find a region face correlated to the tracked face of the second frame 808 using the overlapping area determination method. The server 103 may determine an active tracking region 814 related to the person of interest 804-2 in the second frame 808 using the correlation filter. For example, the server 103 may discover the similarities between the person of interest 804-1 and the unblocked part of the person of interest 804-2, and determine an active tracking region 814 based on the similarities. The server 103 may determine the active tracking region 814 as the tracked face of the third frame 810. The server 103 may determine a face region 816 using a face recognition method in the third frame 810. The server 103 may determine that the face region 816 correlates to the tracked face of the third frame 810 and the person of interest 804-3 is the same person as the person of interest 804-1 even when the person of interest 804-2 is blocked and may not be tracked in the second frame 808.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

I claim:

1. A system for tracking an object in video surveillance, comprising:
   at least one storage medium including a set of instructions for tracking the object in video surveillance; and
   at least one processor in communication with the storage medium, wherein when executing the set of instructions, the at least one processor is directed to:
      obtain a video including a plurality of consecutive frames;
      obtain a current frame from the plurality of consecutive frames, wherein an object of interest is identified in at least two previous frames of the current frame;
      determine a searching region in the current frame based on a reference frame associated with the current frame, wherein the searching region is an enlarged face recognition box in the current frame with respect to a face recognition box corresponding the object of interest of the reference frame, and the enlarged face recognition box is determined based on an enlargement degree;
      obtain at least two template frames from the at least two previous frames, wherein the at least two template frames include a plurality of features of the object of interest; and
      for each of the at least two template frames, determine at candidate face regions based on the searching region and the at least two template frames using a correlation filter to obtain at least two candidate face regions;
      identify a position related to a face of the object of interest in the current frame based on the at least two candidate face regions; and
      update the face of the object of interest in a later frame based on the at least two candidate face regions.

2. The system of claim 1, wherein the at least one processor is further directed to:
   identify the object of interest in one or more later frames of the current frame based on the identified position related to the object of interest in the current frame.

3. The system of claim 1, wherein the object of interest is a person of interest, and the at least one processor is further directed to:
   obtain one or more tracked faces from the video;
   determine one or more face regions based on the current frame;
   select a tracked face from the one or more tracked faces;
   select a face region from the one or more face regions; and
   determine whether the face region correlates to the tracked face.

4. The system of claim 3, wherein the at least one processor is further directed to:
   in response to a determination that the face region correlates to the tracked face, correlate the face region with a person of interest corresponding to the tracked face; and
   update the tracked face in the current frame with the face region.

5. The system of claim 3, wherein the at least one processor is further directed to:
   in response to a determination that the face region does not correlate to the tracked face, identify the position related to a person of interest in the current frame based on the correlation filter; and
   update the tracked face in the current frame with the identified position.

6. The system of claim 3, wherein to determine whether the face region correlates to the tracked face, the at least one processor is further directed to:
   determine whether a percentage of overlapping area between the face region and the tracked face exceeds an overlapping threshold; and
   in response to a determination that the percentage of overlapping area exceeds the overlapping threshold, determine that the face region correlates to the tracked face.

7. The system of claim 1, wherein the object of interest is a person of interest, and to obtain the at least two template frames, the at least one processor is further directed to:
   determine a matching period associated with the person of interest based on previous frames of the current frame; and
   determine the at least two template frames based on the matching period, wherein the person of interest is identified in the at least two template frames.

8. The system of claim 1, wherein the reference frame is a previous frame next to the current frame.

9. The system of claim 7, wherein the at least two template frames include a first frame in the matching period, a middle frame in the matching period, and a last frame in the matching period.

10. The system of claim 1, wherein the determining the searching region includes:
determining the enlargement degree; and
determining the searching region based on the reference frame and the enlargement degree.

11. The system of claim 1, wherein the enlargement degree is adjustable.

12. A method for tracking an object in video surveillance, comprising:
obtaining a video including a plurality of consecutive frames;
obtaining a current frame from the plurality of consecutive frames, wherein an object of interest is identified in at least two previous frames of the current frame;
determining a searching region in the current frame based on a reference frame associated with the current frame, wherein the searching region is an enlarged face recognition box in the current frame with respect to a face recognition box corresponding the object of interest of the reference frame, and the enlarged face recognition box is determined based on an enlargement degree;
obtaining at least two template frames from the at least two previous frames, wherein the at least two template frames include a plurality of features of the object of interest; and
for each of the at least two template frames, determine at candidate face regions based on the searching region and the at least two template frames using a correlation filter to obtain at least two candidate face regions;
identifying a position related to a face of the object of interest in the current frame based on the at least two candidate face regions; and
updating the face of the object of interest in a later frame based on the at least two candidate face regions.

13. The method of claim 12 further comprising:
identifying the object of interest in one or more later frames of the current frame based on the identified position related to the object of interest in the current frame.

14. The method of claim 12, wherein the object of interest is a person of interest, and the method further includes:
obtaining one or more tracked faces from the video;
determining one or more face regions based on the current frame;
selecting a tracked face from the one or more tracked faces;
selecting a face region from the one or more face regions; and
determining whether the face region correlates to the tracked face.

15. The method of claim 14 further comprising:
in response to a determination that the face region correlates to the tracked face, correlating the face region with a person of interest corresponding to the tracked face; and
updating the tracked face in the current frame with the face region.

16. The method of claim 14 further comprising:
in response to a determination that the face region does not correlate to the tracked face, identifying the position related to a person of interest in the current frame based on the correlation filter; and
updating the tracked face in the current frame with the identified position.

17. The method of claim 14, wherein the determining whether the face region correlates to the tracked face includes:
determining whether a percentage of overlapping area between the face region and the tracked face exceeds an overlapping threshold; and
in response to a determination that the percentage of overlapping area exceeds the overlapping threshold, determining that the face region correlates to the tracked face.

18. The method of claim 12, wherein the object of interest is a person of interest, and the obtaining the at least two template frames includes:
determining a matching period associated with the person of interest based on previous frames of the current frame; and
determining the at least two template frames based on the matching period, wherein the person of interest is identified in the at least two template frames.

19. The method of claim 18, wherein the at least two template frames include a first frame in the matching period, a middle frame in the matching period, and a last frame in the matching period.

20. A non-transitory computer readable medium, comprising at least one set of instructions for tracking an object in video surveillance, wherein when executed by at least one processor of one or more electronic device, the at least one set of instructions directs the at least one processor to:
obtain a video including a plurality of consecutive frames;
obtain a current frame from the plurality of consecutive frames, wherein an object of interest is identified in at least two previous frames of the current frame;
determine a searching region in the current frame based on a reference frame associated with the current frame, wherein the searching region is an enlarged face recognition box in the current frame with respect to a face recognition box corresponding the object of interest of the reference frame, and the enlarged face recognition box is determined based on an enlargement degree;
obtain at least two template frames from the at least two previous frames, wherein the at least two template frames include a plurality of features of the object of interest; and
for each of the at least two template frames, determine at candidate face regions based on the searching region and the at least two template frames using a correlation filter to obtain at least two candidate face regions;
identify a position related to a face of the object of interest in the current frame based on the at least two candidate face regions; and
update the face of the object of interest in a later frame based on the at least two candidate face regions.

* * * * *